Dec. 5, 1961 M. A. BAUMANN 3,011,260
APPARATUS FOR DETERMINING THE ANGLE OF LEAD
FOR FIRING AT AERIAL OBJECTIVES
Filed Nov. 19, 1958 3 Sheets-Sheet 1

Inventor:
Martin A. Baumann
by:
Michael S. Striker
Attorney

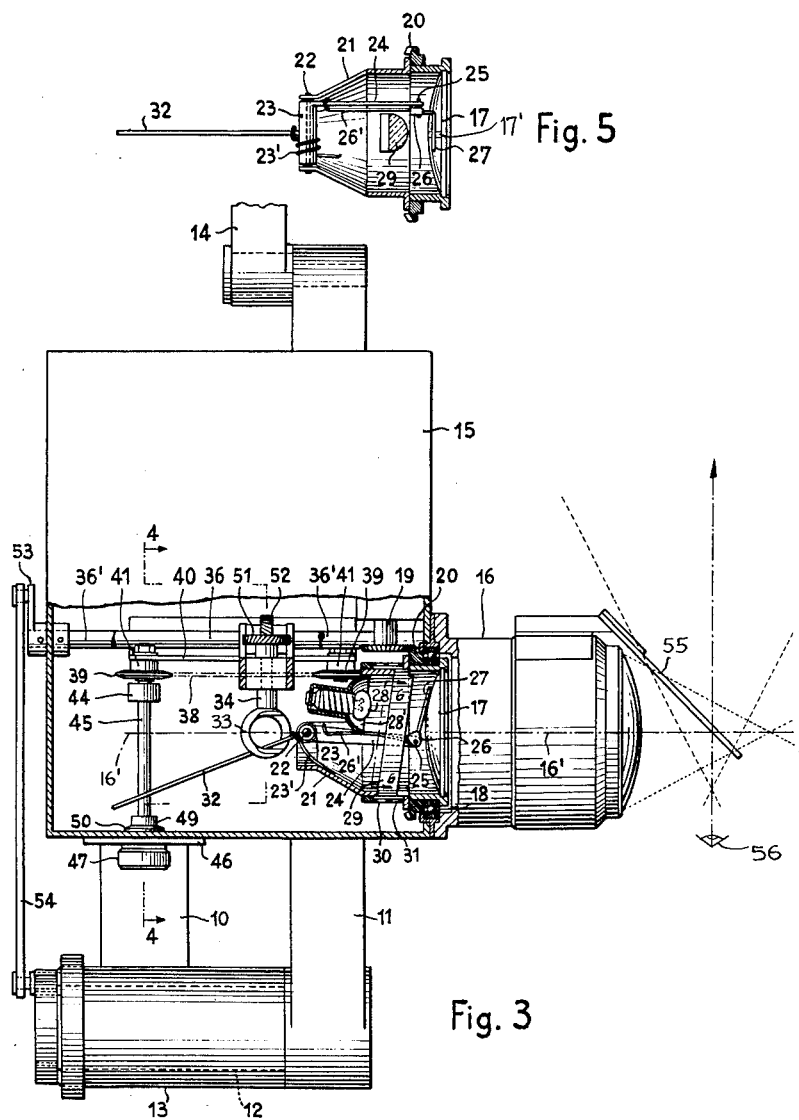

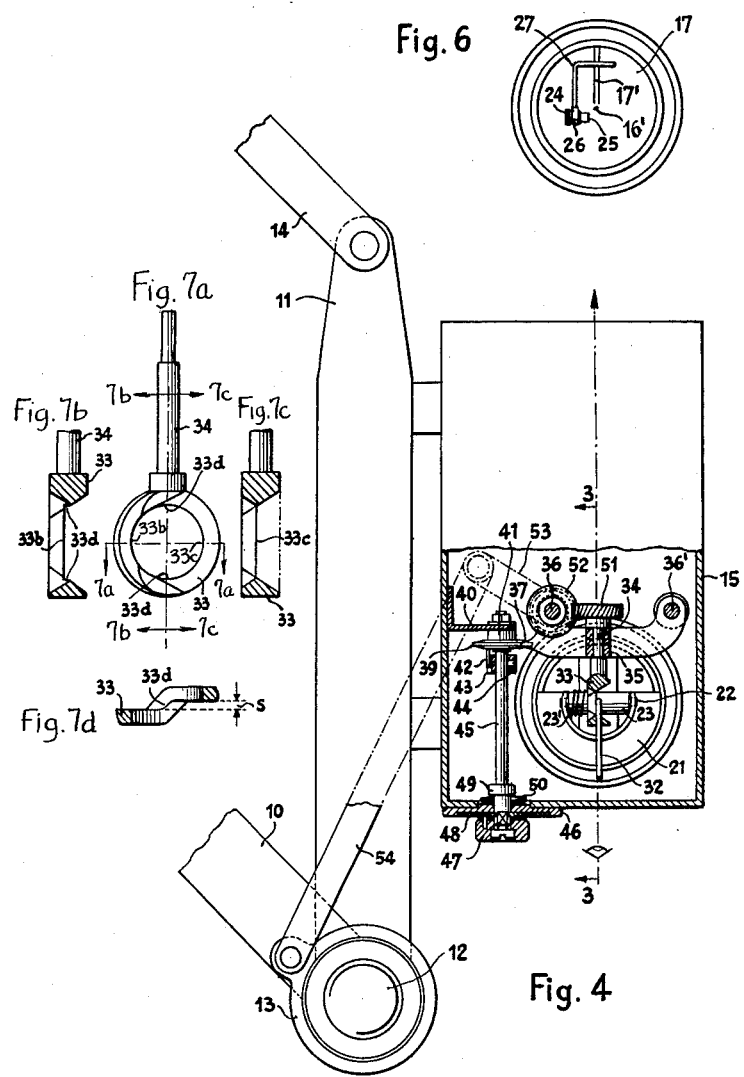

United States Patent Office 3,011,260
Patented Dec. 5, 1961

3,011,260
APPARATUS FOR DETERMINING THE ANGLE OF LEAD FOR FIRING AT AERIAL OBJECTIVES
Martin A. Baumann, Liebefeld, near Bern, Switzerland, assignor to Xamax A.G., Zurich, Switzerland, a firm
Filed Nov. 19, 1958, Ser. No. 774,926
Claims priority, application Austria Nov. 28, 1957
15 Claims. (Cl. 33—49)

For the purpose of determining the angle of lead for firing at aerial objectives, it is known to simulate, at least partially, in the sighting mechanism the lead triangle lying in the ceiling plane of the objective, and determined by the position of the apparatus, the instantaneous position of the objective, and the expected point of impact. In so doing, in the auxiliary triangle to be simulated in the sighting mechanism, the side of the triangle corresponding to the trajectory extending from the position of the apparatus to the point of impact is of invariable length, while the side of the triangle corresponding to the lead trajectory is determined as the product of the speed of flight of the objective and a time factor which is approximately dependent on the distance of the objective from the position of the apparatus and on the ballistic properties of the ammunition used, and is therefore variable in length.

In the sighting mechanism the direction of the side of the auxiliary triangle corresponding to the lead trajectory can be adjusted parallel to the estimated target course, that is to say parallel to the direction of movement of the flying objective in the horizontal projection, and has an operative connection with the lateral movement of the aiming apparatus such that, by compensation of the lateral movement, the direction of his side of the triangle, once adjusted, is retained. Apparatus also exists in which the vertical component of the speed of the flying objective may also be taken into account.

The manipulation of these previously known apparatuses is based on estimation of the direction of course of the objective, and experience shows that this estimate is possible only very inaccurately and requires a considerable amount of time, especially if a more precise estimation of the direction of course of the objective is desired, using auxiliary means. Since, however, it has become possible rapidly and reliably to determine the ceiling plane separately, assuming rectilineary movement of the objective, according to the present invention a considerably simplified apparatus is provided for the determination of the angle of lead. The ceiling plane may, for example, be fixed by two sighting rays each of which passes from the location of the apparatus through an instantaneous location of the aerial objective, while for the purpose of fixing the adjustment plane in the apparatus (corresponding to the ceiling plane) mechanical elements associated with the sighting rays are adjustable by the aiming movements. Such an apparatus is described in German patent specification No. 953,047.

The invention will be best understood from the following description of a specific embodiment when read in connection with the accompanying drawings, in which:

FIG. 3 is a plan view of an embodiment of the present invention, partially in section along the line 3—3 in FIG. 4, and illustrating the device set to a target elevation of zero degrees;

FIG. 4 is a side elevation of the device shown in FIG. 3, partially in vertical section along the line 4—4 in FIG. 3;

FIG. 5 is a vertical sectional view illustrating a detail of the device shown in FIG. 3;

FIG. 6 is a fragmentary vertical section taken on line 6—6 in FIG. 3;

FIG. 7a is an elevational view of a guide member employed in the embodiment of FIG. 3;

FIG. 7b is a sectional view taken on line 7b—7b in FIG. 7a;

FIG. 7c is a sectional view taken on line 7c—7c in FIG. 7a; and

FIG. 7d is a sectional view taken on line 7d—7d in FIG. 7a.

Figure 1:
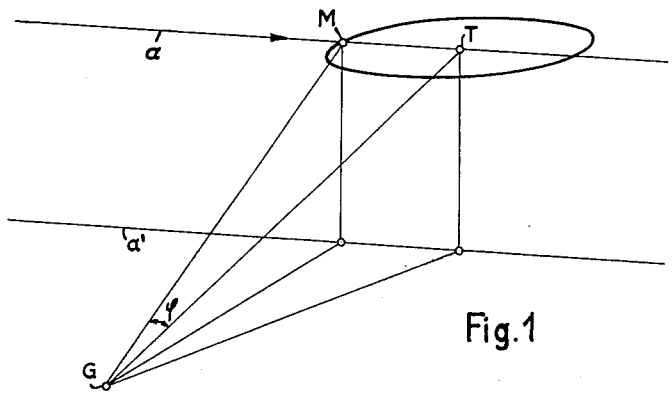
FIG. 1 is a diagram illustrating the geometrical conditions during aiming at a moving aerial target in axonometric representation.

Referring now to FIG. 1, the target, an aerial objective, moves on the horizontal straight-line course $a$, of which the projection on the map or horizontal plane is denated by $a'$. The lead triangle is determined by the position of the apparatus G, the instantaneous position M of the objective, and the expected point of impact T, and the angle of lead $\varphi$ is projected from the lead trajectory MT, which may be regarded as the radius of a horizontal circle having the point of impact T as center and representing the geometric position of all possible instantaneous positions of the objective relating to the point of impact T, for a determined speed $v_h$ of the objective and a determined time of flight $t$ of the projectile from G to T.

The sighting mechanism forming the subject of the present invention for determining the angle of lead for firing on flying objectives, is equipped with a device which, for a known ceiling plane, effects mechanical simulation of the lead triangle lying in the ceiling plane. In the simulated lead triangle, the side of the triangle corresponding to the lead trajectory has an invariable length and is simulated by the radius of the circular guide surface of a guide member the center of whose circle lies on the optical axis of the sight. Preferably, the guide member is rotatable, according to the position angle, about an axis perpendicular to the optical axis, while for the purposes of allowing for the speed of the objective and the ballistic properties of the ammunition used, the side of the triangle corresponding to the trajectory from the position of the apparatus to the point of impact in the lead triangle is varied by moving the guide member with the centre of its circle along the optical axis. A spring force urges a cylindrical bar against the inside contour circular guide surface, which bar is rockable about a point lying on the optical axis and corresponding to the position of the apparatus. When the bar rocks in the ceiling plane, the optical axis and the bar enclose the angle of lead.

Figure 2:
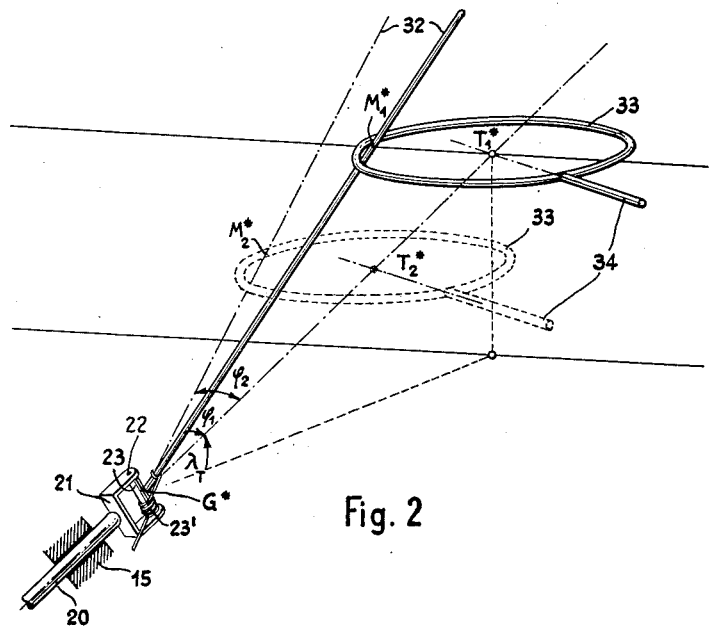
FIG. 2 is a diagrammatic axonometric view schematically illustrating the basic construction of the present invention.

Referring now to FIG. 2, a guide element 33 in the form of a ring is rotatable by means of a shaft 34, to which there is imparted (through drive means not shown) a compensatory rotation for elevation such that the guide ring 33 always remains in a horizontal plane. A thin cylindrical bar 32 is rotatable by means of a shaft 20, the axis of which coincides with the optical axis of the apparatus and which shaft has at one end a U-shaped stirrup 21, in the two limbs of which is mounted a pin 23, on which the bar 32 is fastened at right angles to its axis. The axes of the shafts 20 and 23 disposed at right angles to one another, and of the bar 32 intersect at the point G*, representing the simulation of the position of the apparatus G (FIG. 1), and those of the shafts 34 and 20 disposed at right angles to one another intersect at the center $T^*_1$ of the guide ring 33, which center represents the simulation of the point of impact T (FIG. 1). A torsion spring 23' bears on the bar 32, said torsion spring being mounted on the shaft 23 and pressing the bar 32 resiliently against the inside contour of the guide ring 33. By means of the aiming unit of the apparatus the shaft 20 can be adjusted so that the shaft 23 is always at right angles to the adjustment plane in the apparatus corresponding to the ceiling plane, with the result that the bar 32 bears against the guide ring 33 at the point $M^*_1$ representing the simulation of the instantaneous position on M (FIG. 1) of the objective, and the angle of lead $\varphi_1$ is enclosed between the bar 32 and the optical axis $G^*T^*_1$. The point $M^*_1$ may be regarded as the point of intersection of the axis of the bar 32 and the plane of the guide ring 33, the totality of all these points $M^*_1$ giving the ideal lead circle.

The side of the triangle simulated in the sighting mechanism for the lead trajectory MT is thus of constant length. If this length is regarded for example as a unit of measurement with the value one, then a change of scale by the factor $$\frac{1}{v_h \cdot t}$$

results for the other two sides of the auxiliary triangle. To satisfy this condition, the shaft 34 with the guide ring 33 is made slidable parallel to itself in the direction of the optical axis and can be adjusted along the optical axis: for example, for a larger $v_h$ value, it may be adjusted to the position shown by broken lines in FIGURE 2, with $T^*_2$ as center. In these circumstances, in consequence of the spring action, the bar 32 assumes the position shown by chain-dotted lines, with the point $M^*_2$ on the guide ring 33 and the angle $\varphi_2$ enclosed between it and the optical axis correspondingly greater.

The multiplication of the trajectory GT by the factor $$\frac{1}{t}$$

further means that the same is also dependent on the time of flight of the projectile or on the mean projectile speed. As is well known, the means projectile speed on the one hand varies only very little with the range and on the other hand only the trajectory GM is known at the time of firing, for which reason it is advantageous to use as an approximation the mean projectile speed to the instantaneous position M for the determination of this factor.

Referring now to the embodiment illustrated in FIGS. 3–7d, the device is mounted on an anti-aircraft gun (not shown) adjustable as to azimuth. A carrying arm 11 is mounted to rock in the vertical plane of the gun by means of a journal 12 located a bearing 13 in a support 10 which is fastened to the gun. The vertical adjustment of the carrier arm 11 according to the desired target elevation angle setting of the gun is effected by the known principle of parallel guidance by a rod 14 pivotally connected to the other end of the carrier arm 11. The housing 15 which is secured fast to the carrier arm 11, thus participates in the adjustment movements of the gun faithfully as regards the elevation angle. In FIGURES 3 and 4, the position and state of the sighting device correspond to the position angle $\lambda_T = 0°$.

A reflex sight 16, shown only in partial section, projects from one of the two side walls of the housing a reticule means 17 is mounted in a ball bearing 18 to be rotatable about its optical axis 16', and its adjustment is effected by way of a pair of bevel gears 19, 20 in accordance with the ceiling plane determined in known manner disclosed for example, in the Swiss Patent 316,328. Secured fast to the bevel gear 20 is a partly cut-out funnel-shaped part 21, which carries a pivot pin 22, the axis of which intersects the optical axis 16' of the reflex sight at right angles. Mounted rotatably on pivot pin 22 is a sleeve 23, on which, outside the optical axis of the reflex sight, one end of a link 24 is fastened which carries at its other end a pivot 25 the axis of which is parallel to the pivot 22. Mounted rotatably on said pivot 25 is a sleeve 26 provided with a segment. Fastened on said sleeve is one end portion of a thin rod 27, the other end portion of which is bent at right angles and interrupts the path of rays of a source of light 28 disposed eccentrically on the funnel-shaped part 21 in such manner that the illuminated reticle line 17' of the reflex sight (FIGURE 6) is interrupted by a gap which when the reflex sight is employed during the firing on the objective, is used as an objective mark in the field of view of the sight. A transparent reflector 55 is arranged at an angle to the optical axis 16', so that an image of the reticle line 17', interrupted by a gap, appears to be located in the ceiling plane GMT (FIG. 1) to the eye 56 of an observer who views the target through transparent reflector 55. Also fastened in the segment of the sleeve 26 is a torsion spring 26', which at the other end bears on the link 24 and causes the bent-off end of the rod 27 to bear, and slide lightly, on the reticule 17 in all positions.

Disposed behind the light source 28 is a reflex mirror 28', and in the path of the rays from the light source 28 to the hair line 17' there is located an approximately semi-cylindrical glass bar 29 as an optical ray collector, which concentrates the light rays concentrically onto the line 17' of the reticule means and thereby considerably increases the illumination effect. The light source 28, co-rotating with the part 21, receives electric current through two co-rotating slip rings 30, 31 from spring contacts (not shown in detail) bearing on the slip rings.

Fastened in the sleeve 23 is a thin cylindrical bar 32, which extends through a guide ring 33 with a circular inside contour and the axis of which intersects the optical axis 16' of the reflex sight at the axis of the shaft 22. If the axis of the bar 32 coincides with the optical axis 16' of the reflex sight, then the objective mark produced by the rod 27 is situated on said optical axis. A torsion spring 23' disposed on the sleeve 23 causes the bar 32 always to bear against the inside contour of the guide ring 33.

Said guide ring 33 is mounted on a shaft 34 in a carrier part 35 to rotate about an axis passing through the center of the inside contour of the guide ring at right angles to the optical sighting axis.

The carrier 35 is slidable on two rods 36, 36' disposed parallel to the optical sighting axis in the housing 15.

One of the two parallel walls of the carrier engages by a tooth 37 in an endless driver chain 38, which passes around two chain wheels 39, the axes of which are parallel to the shaft 34, and which are each mounted on a pivot 41 on a support 40 fastened in the housing 15. The chain wheel 39, shown in FIGURE 4, has a driver pin 42 parallel to its axis, which pin engages in the groove 43 of a coupling ring 44 screwed fast on an adjusting shaft 45 coaxial with the chain wheel. Said shaft is mounted at one end in a bore in the pivot 41, and at the other end in a plate 46 fastened on the outer wall of the housing and carries, fastened on its outer end, a milled knob 47 on which is fastened a circular dial 48, let into a corresponding recess of the plate 46, by means of which knob the carrier 35 can be moved to and fro, by the chain 38, the chain wheel 39 and the shaft 45, with respect to a mark disposed on the plate 46. Cup springs 50 disposed between a collar 49 of the shaft 45 and the plate 46 impose friction for the purposes of holding fast the movable parts in any desired position.

Fastened on the guide ring shaft 34 is a screw gear 51, with which engages a second screw gear 52 mounted, and slidable together with the carrier 35, on a shaft 36, and connected to the shaft 36 by a key to prevent rotation. This shaft projects out of the housing and is articulated to the support 10, 13 by means of a parallel linkage 53, 54, as indicated by chain-dotted lines in FIGURE 4. The effect thereby achieved is that on rocking movements of the housing 15 the shaft 36 compensates the housing rotation, i.e., performs a counter-rotation faithfully in respect of position angle in relation to the housing, which counter-rotation is transmitted to the guide ring 33 by way of the pair of screw gears 51, 52 so that the angle between the ring plane and the optical axis of the reflex sight always corresponds to the position angle $\lambda_T$ of the gun (see FIGURE 2). The reciprocating motion of the carrier 35 influences the position angle adjustment of the guide ring in no way whatever.

If the position angle $\lambda_T$ is equal to 0°, as shown in FIGURES 3 and 4, the conditions are such that the plane containing the optical axis 16' and the axis of the bar 32, and the plane containing the ideal lead circle, coincide. Since, however, the bar 32 extends with uniform thickness s even in this position through the guide ring 33, its inside contour has two practically equal arc portions 33b and 33c which extend in parallel planes and which are situated opposite one another with respect to the axis of the shaft 34, and which are connected together at both ends in each case by a contour path 33b curved in the form of an S, the two parallel planes each being staggered practically by half the thickness of the bar 32 in relation to the axis of the shaft 34 (FIGURE 7). The inside contour is constructed as a knife-edge, so that the axis of the bar 32 may pass as exactly as possible through the respective measuring point $M_1^*$ (FIGURE 2) simulating the instantaneous position M of the objective (FIGURE 1). FIGURE 7a shows the side of the guide ring normally turned away from the sight optical system, where the recess for the bar 32 is larger than on the side facing the optical system.

The scale provided on the dial 48 is based on the simplifying assumption that the factor $1/t$, that is, the mean projectile speed, is constant for all ranges. If the exact objective sped $v_h$ is not known and can only be estimated, it is permissible to take into account only a mean projectile speed and a mean value of the effective range. Since the mean projectile speed decreases with increasing range, the lead indicated for the ranges lying below the mean range will be somewhat too large and at larger ranges will be somewhat too small.

It would however be possible to displace the guide ring 33 additionally in order to allow for the exact mean projectile flying times to the respective measuring point M, and this can be carried out by mechanical or optical means. For example, the scale of the dial 48 may be appropriately constructed, appropriate spiral curves being plotted instead of radial scale graduations denoting the various objective speeds, a determined objective range (GM in FIGURE 1) being associated with each radius from the center of the dial 48. This can be indicated by a graduated scale engaging over the dial 48, the knob 47 being adjusted in each case in such manner that the curve of the estimated or measured objective speed coincides with the corresponding mark of the measured (or possibly estimated) objective range.

The torsion spring 23' pressing the bar 32 against the inside contour of the ring 33 causes the thin bar 32 to undergo a slightly elastic bending. This factor may be allowed for by making the bar 32 not linear but with an appropriately opposite curvature lying in the ceiling plane.

In view of the pivotal connection between the bar 32 and the bent-off end of the rod 27 producing the mark, there exists a non-linear relation between the angle of lead determined by the bar 32 and the angle of lead indicated in a distortion-free reflex sight optical system. This serves for the correction of certain distortions of the image of the lens, thus rendering possible a considerable simplification in the construction of the optical part of the reflex sight.

In the present exemplified embodiment, simulation of the lead triangle in the device is turned through 90° in relation to the actual lead triangle, this being due to the fact that the path of the rays in the reflex sight is turned through 90°. While during the taking of a sight on the objective the axis GT is swung according to the position angle, and the imaginary lead circle about T as center always remains horizontal, in the device the optical axis 16' of the reflex sight is kept horizontal, while the guide ring 33 is so turned by means of the shaft 34 with respect to the optical axis 16' that the guide ring plane and the said axis enclose between them the respective position angle.

The device is operated as follows: The reticule plate 17 is turned by manual operation through bevel gears 19 and 20 into a position in which the reticule is located in the ceiling plane, which is first determined in a known manner by the apparatus disclosed in the Swiss Patent 316,328. Holding part 21, pivot means 22, 23, and bar 32 turn with the reticule means. Consequently, bar 32 is rockable about the pivot axis of the pivot means 22, 23 in a plane corresponding to the ceiling plane of the target to which the apparatus was set by turning of the reticule means.

The speed of the target is estimated, or determined with suitable apparatus, and the knob 47 is turned and set in accordance with the adjustment scale 46 whose indicia represent different horizontal speeds of the target. Knob 47 is part of operating means 45, 39, 38, 35 by which guide member 33 is moved along the optical axis 16' until its position, and distance from the pivot axis of pivot means 22, 23, correspond to the respective speed of the target.

The apparatus is now set to the desired target elevation angle so that the operating means 53, 54, 36, 51, 52 turn the guide member 33 to compensate for the elevation.

Spring 23' urges bar 32 to assume a position abutting the inner circular surface of guide member 33 and defining with the optical axis 16' the lead angle. Arm 24, and portion 27 move with bar 32 to a corresponding position abutting the reticule means 17.

The light projected by the source of light 28 is concentrated by the collector 29 so that a bright image of the reticule is formed on the transparent reflector 55 which appears to the eye 56 of the observer to be located in the ceiling plane. The bright image of the reticule is interrupted by a dark gap, produced by portion 27, and this gap constitutes a mark which is made to coincide with the target by an aiming operation, whereupon the gun may be fired.

The device described determines the angle of lead only for horizontal movements of the objective. It can however be shown that for a slight inclination of the direction of flight (for example up to 20°) the resulting errors in the lead remain relatively small. The indicating mark then gives a useful guidance point for the lead value to be observed.

In consequence of the need to allow the bar 32 to slide on the inside contour of the guide ring 33, this device operates perfectly only up to a certain minimum position angle, which lies, however, outside the usual range of requirements. A spring stop or the like may be provided to prevent this minimum position angle from being attained.

The gun barrel must also be raised in known manner by the so-called angle of elevation in order that the projectile may fly to the point of impact determined.

Since the luminous line 17' of the reticule 17, indicating the direction of flight, extends only from the optical axis 16' to the extreme edge, the illuminating device must be disposed to co-rotate eccentrically in such manner that the direction of the line of flight is uniformly illuminated over its entire length. It is thus possible to use a weaker source of light than if said source were disposed, as is usual, stationary in the optical axis. In the exemplified embodiment described, the optical collector bar further ensures that the illuminating effect of the reticule on the direction of the line of flight is further increased.

What I claim is:

1. In an apparatus for aiming at aerial targets, in combination, a device for simulating a lead angle defined by the position of a target, the expected point of impact, and the position of the apparatus, the device comprising sight means having an optical axis; an annular guide member having an inner circular guide surface centered on said optical axis; supporting means supporting said guide member for movement in the direction of said optical axis; pivot means having a pivot axis perpendicular to, and passing through said optical axis, said pivot means being turnable about said optical axis; an elongated bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direciton of said optical axis to an adjusted position determined by the speed of the target and other known factors so that in said adjusted position of said guide member, said bar defines the lead angle with said optical axis; and indicator means connected to said bar and rocking with the same for indicating the angular position of said bar to an observer.

2. In an apparatus for aiming at aerial targets, in combination, a device for simulating a lead angle defined by the position of a target, the expected point of impact, and the position of the apparatus, the device comprising sight means having an optical axis; an annular guide member having an inner circular guide surface centered on said optical axis; supporting means supporting said guide member for movement in the direction of said optical axis and for turning movement about an axis perpendicular to said optical axis; pivot means having a pivot axis perpendicular to, and passing through said optical axis, said pivot means being turnable about said optical axis; an elongated bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means; and indicator means connected to said bar and rocking with the same for indicating the angular position of said bar to an observer.

3. A device as set forth in claim 2 wherein said second operating means include an adjustment scale having indicia spaced from each other in accordance with an assumed constant mean projectile speed and adapted to represent different horizontal speeds of the target.

4. In an apparatus for aiming at aerial targets, in combination, a device for simulating a lead angle defined by the position of a target, the expected point of impact, and the position of the apparatus, the device comprising sight means having an optical axis; a support supporting said sight means for turning movement about a supporting axis for varying the elevation angle of said side means; an annular guide member having an inner circular guide surface centered on said optical axis; supporting means supporting said guide member for movement in the direction of said optical axis and for turning movement about an axis perpendicular to said optical axis; pivot means having a pivot axis perpendicular to, and passing through said optical axis, said pivot means being turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means, said third operating means being operatively connected to a fixed point of said support to turn said guide member whenever said sight means is turned in accordance with the elevation of the target; and indicator means connected to said bar and rocking with the same for indicating the angular position of said bar to an observer.

5. In an apparatus for aiming at aerial targets, in combination, a device for simulating a lead angle defined by the position of a target, the expected point of impact, and the position of the apparatus, the device comprising sight means having an optical axis, said sight means including an optical system defining said optical axis, a transparent reflector extending at an angle to said optical axis and permitting an observer to view the target therethrough, and reticule means turnable about said optical axis for projecting a reticule image onto said reflector so that the image can be made to coincide with the target by adjustment of the apparatus; an annular guide member having an inner circular guide surface centered on said optical axis; supporting means supporting said guide member for movement in the direction of said optical axis and for turning movement about an axis perpendicular to said optical axis; pivot means having a pivot axis perpendicular to, and passing through said optical axis, said pivot means being connected with said reticule means and turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulating ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means; and indicator means connected to said bar and rocking with the same for indicating the angular position of said bar to an observer, said indicator means including a portion extending across said reticule means so that the projected image of said reticule means on said transparent reflector appears interrupted, the interrupted point of the image covering the target when the apparatus is accurately aimed.

6. An apparatus as set forth in claim 5 wherein said indicator means includes two articulated arms, one of said arms including said portion and the other of said arms being connected to said bar for rocking movement, and means for guiding said portion along a selected path whereby said portion moves along said path at a speed different from the speed of movement of said one arm to compensate distortions produced by said optical system.

7. An apparatus as set forth in claim 5 wherein said sight means includes a bar-shaped collector, and a light source transversely spaced from said optical axis for projecting light onto said collector which concentrates the light on said reticule means.

8. In an apparatus for aiming at aerial targets, in combination, a device for simulating a lead angle defined by the position of a target, the expected point of impact, and the position of the apparatus, the device comprising sight means having an optical axis, said sight means including reticule means turnable about said optical axis; an annular guide member having an inner circular guide surface centered on said optical axis; supporting means supporting said guide member for movement in the direction of said optical axis and for turning movement about an axis perpendicular to said optical axis; pivot means having a pivot axis perpendicular to, and passing through said optical axis, said pivot means being connected with said reticule means and turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means; and indicator means connected to said bar and rocking with the same for indicating the angular position of said bar to an observer, said indicator means including a portion extending across said reticule means so that the image of said reticule means appears interrupted, the interrupted point of the image covering the target when the apparatus is accurately aimed.

9. In an apparatus for aiming at aerial targets, in combination, a device for simulating a lead angle defined by the position of a target, the expected point of impact, and the position of the apparatus, the device comprising sight means having an optical axis; an annular guide member having an inner circular guide surface centered on said optical axis; supporting means supporting said guide member for movement in the direction of said optical axis and for turning movement about an axis perpendicular to said optical axis; pivot means having a pivot axis perpendicular to, and passing through said optical axis, said pivot means being turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis, said portion of said bar having an inital curvature and abutting with the convex side thereof against said guide surface so that due to the spring pressure urging said bar against said guide surface, said curved portion of said bar is straightened when abutting said guide surface; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turnng the same about said perpendicular axis to compensate for a variation of the elevation angle of said single means; and indicator means connected to said bar and rocking with the same for indicating the angular position of said bar to an observer.

10. In an apparatus for aiming at aerial targets, in combination, in a device for simulating a lead angle defined by the position of a target, the expected point of impact, and the position of the apparatus, the device comprising sight means having an optical axis; an annular guide member having an inner circular guide surface centered on said optical axis, said annular guide member having two arcuate portions extending in parallel planes on opposite sides of said perpendicular axis, said arcuate portions being connected by a pair of S-shaped connecting portions; supporting means supporting said guide member for movement in the direction of said optical axis and for turning movement about an axis perpendicular to said optical axis; pivot means having a pivot axis perpendicular to, and passing through said optical axis, said pivot means being turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means; and indicator means connected to said bar and rocking with the same for indicating the angular position of said bar to an observer.

11. A device as set forth in claim 10 wherein each of said arcuate portions is spaced from said perpendicular axis substantially half the thickness of said bar.

12. In an apparatus for aiming at aerial targets, in combination, a device for simulating a lead angle defined by the position of a target, the expected point of impact, and the position of the apparatus, the device comprising sight means having an optical axis, said sight means including reticule means turnable about said optical axis; a support supporting said sight means for turning movement about a supporting axis for varying the elevation angle of said side means; an annular guide member having an inner circular guide surface centered on said optical axis; supporting means supporting said guide member for movement in the direction of said optical axis and for turning movement about an axis perpendicular to said optical axis; pivot means having a pivot axis perpendicular to, and passing through said optical axis, said pivot means being connected with said reticule means and turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means, said third operating means being operatively connected to a fixed point of said support to turn said guide member whenever said sight means is turned in accordance with the elevation of the target; and indicator means connected to said bar and rocking with the same for indicating the angular position of said bar to an observer, said indicator means including a portion extending across said reticule means so that the image of said reticule means appears interrupted, the interrupted point of the image covering the target when the apparatus is accurately aimed.

13. In an apparatus for aiming at aerial targets, in combination, a device for simulating a lead angle defined by the position of a target, the expected point of impact, and the position of the apparatus, the device comprising sight means having an optical axis, said sight means including reticule means turnable about said optical axis; an annular guide member having an inner circular guide surface centered on said optical axis, said annular guide member having two arcuate portions extending in parallel planes on opposite sides of said perpendicular axis, said arcuate portions being connected by a pair of S-shaped connecting portions; supporting means supporting said guide member for movement in the direction of said optical axis and for turning movement about an axis perpendicular to said optical axis; pivot means having a pivot axis perpendicular to, and passing through said optical axis, said pivot means being connected with said reticule means and turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means; and indicator means connected to said bar and rocking with the same for indicating the angular position of said bar to an observer, said indicator means including a portion extending across said reticule means so that the image of said reticule means appears interrupted, the interrupted point of the image covering the target when the apparatus is accurately aimed.

14. In an apparatus for aiming at aerial targets, in combination, a device for simulating a lead angle defined by the position of a target, the expected point of impact, and the position of the apparatus, the device comprising sight means having an optical axis, said sight means including an optical system defining said optical axis, a transparent reflector extending at an angle to said optical axis and permitting an observer to view the target therethrough, and reticule means turnable about said optical axis and projecting a reticule image onto said reflector so that the image can be made to coincide with the target by adjustment of the apparatus; a support supporting said sight means for turning movement about a supporting axis for varying the elevation angle of said side means; an annular guide member having an inner circular guide surface centered on said optical axis, said annular guide member having two arcuate portions extending in parallel planes on opposite sides of said perpendicular axis, said arcuate portions being connected by a pair of S-shaped connecting portions; supporting means supporting said guide member for movement in the direction of said optical axis and for turning movement about an axis perpendicular to said optical axis; pivot means having a pivot axis perpendicular to, and passing through said optical axis, said pivot means being connected with said reticule means and turnable about said optical axis; a spring-loaded bar secured to said pivot means and extending transverse to said pivot axis said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; third operating means connected to said guide member for turning the same about said perpendicular axis to compensate for a variation of the elevation angle of said sight means, said third operating means being operatively connected to a fixed point of said support to turn said guide member whenever said sight means is turned in accordance with the elevation of the target; and indicator means connected to said bar and rocking with the same for indicating the angular position of said bar to an observer, said indicator means including a portion extending across said reticule means so that the projected image of said reticule means on said transparent reflector appears interrupted, the interrupted point of the image covering the target when the apparatus is accurately aimed.

15. In an apparatus for aiming at aerial targets, in combination, a device for simulating a lead angle defined by the position of a target, the expected point of impact, and the position of the apparatus, the device comprising sight means having an optical axis, said sight means including reticule means turnable about said optical axis; an annular guide member having an inner circular guide surface centered on said optical axis; supporting means supporting said guide member for movement in the direction of said optical axis; pivot means having a pivot axis perpendicular to, and passing through said optical axis, said pivot means being connected with said reticule means and turnable about said optical axis; a spring-loaded bar secured to said pivot means and extending transverse to said pivot axis, said bar having a portion abutting said inner circular guide surface of said guide member and being slidable along the same during turning of said pivot means while rocking about said pivot axis; first operating means connected to said pivot means for turning the same with said bar about said optical axis into a position in which said bar is rockable in a simulated ceiling plane; second operating means connected to said guide member for moving the same in the direction of said optical axis to an adjusted position determined by the speed of the target and other known factors so that in said adjusted position of said guide member, said bar defines the lead angle with said optical axis; and indicator means connected to said bar and rocking with same for indicating the angular position of said bar to an observer, said indicator means including a portion extending across said reticule means so that the image appears interrupted, the interrupted point of the image covering the target when the apparatus is accurately aimed.

References Cited in the file of this patent

UNITED STATES PATENTS 1,988,984     Nyberg _____ Jan. 22, 1935

FOREIGN PATENTS 662,134     Germany _____ July 6, 1938